(12) United States Patent  
Chang et al.

(10) Patent No.: US 9,327,984 B2  
(45) Date of Patent: May 3, 2016

(54) METHOD OF PREPARING GRAPHENE NANOPLATE, PREPARED GRAPHENE NANOPLATE, GRAPHENE NANOPLATE PASTE, AND CONDUCTIVE LAYER INCLUDING THE GRAPHENE NANOPLATE

(71) Applicants: Hyundai Motor Company, Seoul (KR); Korea Institute of Ceramic Engineering and Technology, Seoul (KR)

(72) Inventors: Kwang Il Chang, Gyeonggi-do (JP); Chul Kyu Song, Seoul (KR); Dha Hae Kim, Gangwon-do (KR); Seung Hun Hur, Seoul (KR)

(73) Assignees: Hyundai Motor Company, Seoul (KR); Korea Institute of Ceramic Engineering and Technology, Seoul (KR)

( * ) Notice: Subject to any disclaimer, the term of this patent is extended or adjusted under 35 U.S.C. 154(b) by 208 days.

(21) Appl. No.: 14/144,134

(22) Filed: Dec. 30, 2013

(65) Prior Publication Data

US 2015/0108411 A1    Apr. 23, 2015

(30) Foreign Application Priority Data

Oct. 22, 2013    (KR) .......................... 10-2013-0125887

(51) Int. Cl.
*C01B 31/04*     (2006.01)
*H01B 1/04*     (2006.01)
(Continued)

(52) U.S. Cl.
CPC ......... *C01B 31/0469* (2013.01); *C01B 31/0423* (2013.01); *C01B 31/0438* (2013.01); *C01B 31/0446* (2013.01); *H01B 1/02* (2013.01); *H01B 1/04* (2013.01); *B82Y 40/00* (2013.01); (Continued)

(58) Field of Classification Search
CPC ............ C01B 31/0469; C01B 31/0423; C01P 2004/24
See application file for complete search history.

(56) References Cited

U.S. PATENT DOCUMENTS 6,395,199 B1 * 5/2002 Krassowski ............. H01B 1/24
                                                         205/125
7,115,221 B1 * 10/2006 Spahr ...................... C01B 31/04
                                                           264/15

(Continued)

FOREIGN PATENT DOCUMENTS

| KR | 10-2012-0035659 | 4/2012 |
| KR | 10-2012-0053399 | 5/2012 |

(Continued)

OTHER PUBLICATIONS

She, Y. et al., "Fabrication of polyethylene/graphite nanocomposite from modified expanded graphite", Polymer International, (2007), vol. 56, pp. 679-685.

*Primary Examiner* — Harold Pyon
*Assistant Examiner* — Katie L Hammer
(74) *Attorney, Agent, or Firm* — Mintz Levin Cohn Ferris Glovsky and Popeo, P.C.; Peter F. Corless

(57) ABSTRACT

A method for preparing graphene nanoplate (GNP) is provided and includes preparing expanded graphite (EG) and exfoliating, grinding, or cracking the expanded graphite to crack the EG induced by gas-phase-collision. A graphene nanoplate paste and a conductive coating layer formed of the graphene nanoplate paste are provided and are prepared by the method for preparing graphene nanoplate.

5 Claims, 10 Drawing Sheets

(51) Int. Cl.
    *H01B 1/02*     (2006.01)
    *B82Y 40/00*    (2011.01)
(52) U.S. Cl.
    CPC .......... *C01P2004/24* (2013.01); *Y10S 977/734* (2013.01); *Y10S 977/842* (2013.01); *Y10S 977/932* (2013.01)

(56) References Cited

U.S. PATENT DOCUMENTS

| | | | | |
|---|---|---|---|---|
| 7,785,492 B1* | 8/2010 | Jang | ................ | B82Y 30/00 252/378 R |
| 8,257,867 B2 | 9/2012 | Liu et al. | | |
| 2002/0197201 A1* | 12/2002 | Fukuda | ................ | C01B 31/04 423/448 |
| 2006/0241237 A1* | 10/2006 | Drzal | ................ | C08K 7/00 524/495 |
| 2006/0286022 A1* | 12/2006 | Miyamoto | ............ | B01D 53/02 423/445 R |
| 2009/0026086 A1* | 1/2009 | Zhamu | ................ | B82Y 30/00 205/555 |
| 2009/0135548 A1* | 5/2009 | Yoshio | ................ | H01G 11/42 361/502 |
| 2010/0022422 A1* | 1/2010 | Wu | ................ | B82Y 30/00 507/118 |
| 2012/0149554 A1 | 6/2012 | Lin et al. | | |
| 2012/0171108 A1* | 7/2012 | Kim | ................ | B82Y 30/00 423/448 |
| 2012/0211160 A1* | 8/2012 | Asay | ................ | B82Y 30/00 156/324 |
| 2012/0220198 A1* | 8/2012 | Peukert | ............ | C01B 31/0423 451/28 |
| 2013/0022530 A1* | 1/2013 | Mercuri | ............ | B82Y 40/00 423/447.1 |

FOREIGN PATENT DOCUMENTS

| | | |
|---|---|---|
| KR | 10-2012-0092431 | 8/2012 |
| KR | 10-2013-0091073 A | 8/2013 |

* cited by examiner

METHOD OF PREPARING GRAPHENE NANOPLATE, PREPARED GRAPHENE NANOPLATE, GRAPHENE NANOPLATE PASTE, AND CONDUCTIVE LAYER INCLUDING THE GRAPHENE NANOPLATE

CROSS-REFERENCE TO RELATED APPLICATION

This application claims priority to and the benefit of Korean Patent Application No. 10-2013-0125887 filed in the Korean Intellectual Property Office on Oct. 22, 2013, the entire contents of which are incorporated herein by reference.

BACKGROUND 1 (a) Field of the Invention

This disclosure relates to a method of preparing a graphene nanoplate, a graphene nanoplate prepared according to the method, and a graphene nanoplate paste and a conductive layer including the same.

1 (b) Description of the Related Art

Graphene prepared from graphite may be classified into two types according to a thickness of the graphite. In other words, a reduce grapheme oxide (RGO) that has the number of a graphene layer of less than about 10 and a graphene nanoplate (GNP) that has a thickness of several nm to about 100 nm. The RGO may be prepared by chemical or thermal reduction of graphene oxide (or graphite oxide, GO) that is produced by oxidation treatment of graphite, and the graphene nanoplate may be prepared by exfoliating graphite physicochemically. Specifically, a graphene nanoplate is prepared using an intercalated carbon compound (ICC) including chemical species among graphite layers, and herein, when the ICC is microwave-treated or heat-treated, the chemical species inserted among the graphite layers is output as gas phases and expands a space among the graphite layers to produce an expanded graphite (EG), and the graphene nanoplate may be prepared by breaking (cracking process between partially connected inter-GNP layers) the expanded graphite.

A conventional method for preparing a graphene nanoplate may be classified into a liquid ultrasonication cracking method, a cracking method using a rheological shear stress, a solid-phase-solid-phase or liquid mechanical cracking method (e.g., ball milling, grinding, and the like), and the like based on a method of breaking the expanded graphite. In addition, the graphene nanoplate may be prepared using the same method but have various properties based on a process condition, that is, a microwave treatment condition (e.g., intensity/atmosphere/treatment time/treatment environment, and the like), a heat treatment condition (e.g., temperature/atmosphere: vacuum furnace, heating speed, treatment time/treatment method and the like), and the like.

In the liquid-phase ultrasonication cracking method, a graphene nanoplate is prepared when expanded graphite is broken by a strong impact produced when micro-cavity produced by ultrasonication is repetitively contracted and expanded and then, exploded. This method has an advantage of preparing a graphene nanoplate in a lab environment and preparing substantially low concentration graphene nanoplate dispersion by adding a dispersing agent. However, the method is performed in a liquid and has a limit in a solvent and thus, is adjusted based on a grinding and dispersion condition in a desired solvent, and in addition, and the solvent needs to be evaporated again to obtain a powder from a solution.

The cracking method using a rheological shear stress is a method of forcing liquid-supported expanded graphite into a minute space using a high pressure (e.g., thousands of bars) to grind the expanded graphite and has similar merits and drawbacks to the liquid-phase ultrasonication cracking method. The solid-phase-solid-phase or liquid-phase mechanical cracking method is performed by mixing minute balls with the expanded graphite (herein, a solvent may be partly added thereto) and milling the expanded graphite, and herein, the expanded graphite is ground by energy generated on the interface when the balls collide. However, the produced graphene nanoplates contact one another and are stuck together. Accordingly, in the present invention, a pure graphene nanoplate may be prepared using an ICC raw material to prepare expanded graphite but a novel method of complementing the problems of the conventional methods.

In addition, in the present invention, industrial application (e.g., composite paste) of the graphene nanoplate by combining the graphene nanoplate with a heterogeneous material may be enlarged. Combinations between heterogeneous materials are important, and this may improve properties by synergic effects between materials exceeding a limit of the conventional material. The heterogeneous mixture may be used in a high strength composite material and a fuel cell. As a representative technologies, a graphene-nanowire (e.g., semiconductor) hybrid structure where light energy is absorbed in a graphene conductive part and electron-hole pairs may be generated, a method of preparing a hybrid composite including graphene sheet/carbon nanotube/a polymer nano particle, a method of preparing a positive electrode material for a lithium rechargeable battery graphene that is a hybrid material by adding a Fe precursor and a phosphate ($PO_4$) precursor, a method of preparing a graphene composite calcinated body having improved charge and discharge ratio by sintering graphene and a metal oxide particle in an air, a method of preparing a graphene-titanium dioxide ($TiO_2$) hybrid material by mixing a nano $TiO_2$ powder with graphene at a high temperature and high pressure and reacting them, and the like. The present invention relates to a method of preparing good quality of a graphene nanoplate by a novel method and its application (e.g., paste and conductive layer).

SUMMARY

One exemplary embodiment of the present invention provides a method of preparing a graphene nanoplate that may include exfoliating, grinding, or cracking expanded graphite by gas-phase high speed collision. Another exemplary embodiment of the present invention provides a graphene nanoplate prepared by the preparing method. Yet another embodiment of the present invention provides a graphene nanoplate paste and a conductive coating layer including the graphene nanoplate.

According to one exemplary embodiment of the present invention, a method of preparing a graphene nanoplate (GNP) may include preparing expanded graphite (EG); and exfoliating, grinding, or cracking the expanded graphite by gas-phase high speed collision (e.g., cracking of EGs induced by gas-phase-collision).

The process of exfoliating, grinding, or cracking and grinding the expanded graphite by gas-phase high speed collision may be performed by inducing collision of the expanded graphite with a gas-phase speed at about $0.5 \times 10^2$ to about $10 \times 10^2$ m/s. The process of exfoliating, grinding, or cracking the expanded graphite by gas-phase high speed collision may be performed by a turbulence inducing method, a supersonic expansion method, or a combination thereof. The turbulence inducing method may include preparing expanded graphite; transferring the expanded graphite into a chamber equipped with a sample inlet and a rotator at a lower part; and spinning the rotator to induce turbulence within the chamber, and exfoliating, grinding, or cracking the expanded graphite by the induced turbulence. The supersonic expansion method may include preparing expanded graphite; injecting a carrier gas and the expanded graphite into an apparatus equipped with a high pressure chamber and a low pressure chamber; and by spraying the expanded graphite from the high pressure chamber into the low pressure chamber exfoliating, grinding, or cracking the expanded graphite by spraying the expanded graphite from the high pressure chamber into the low pressure chamber.

According to another exemplary embodiment of the present invention, graphene nanoplate prepared by the preparing method is provided. The graphene nanoplate may have a thickness of about 5 nm to about 100 nm.

According to yet another exemplary embodiment of the present invention, a GNP paste including the GNP and a conductive coating layer including the GNP paste are provided. A method for preparing a graphene nanoplate by gas-phase high speed collision of expanded graphite, a graphene nanoplate prepared according to the method and a graphene nanoplate paste and a conductive coating layer including expanded graphite may be output.

DETAILED DESCRIPTION

Figure 1:
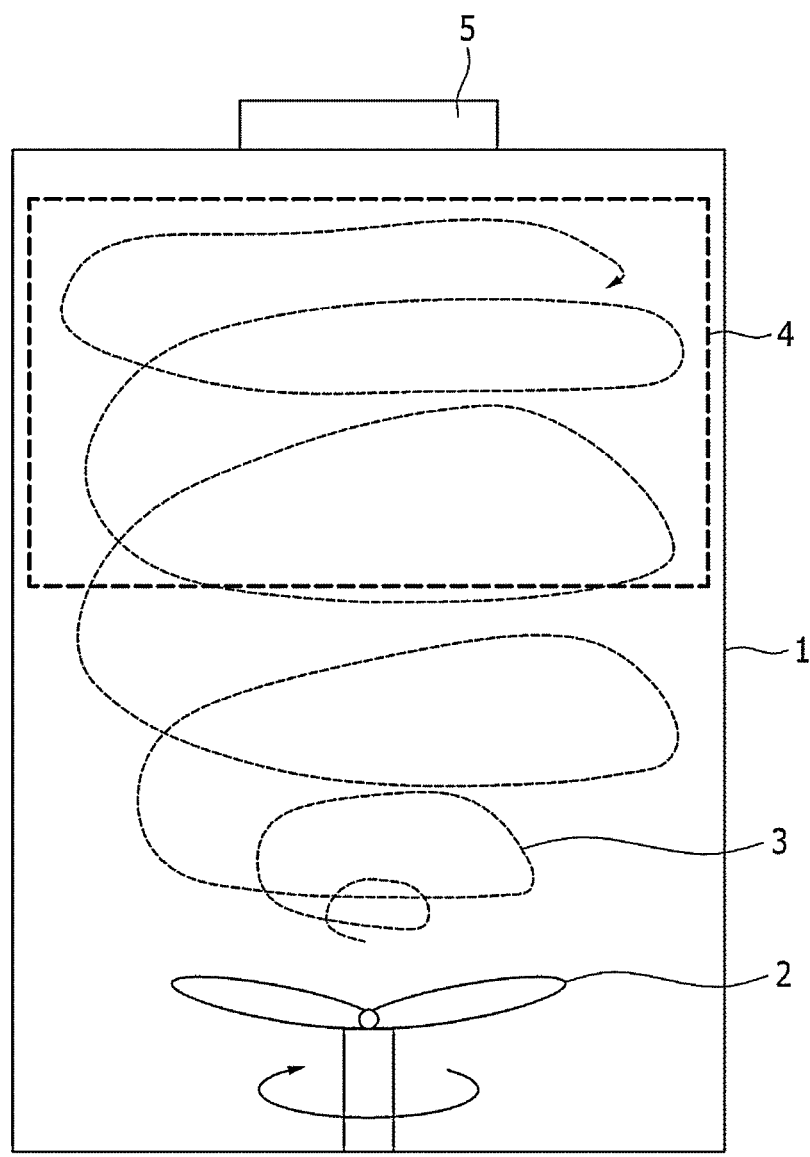
FIG. 1 schematically shows an exemplary preparation of graphene nanoplate by turbulence induced by rotation of a rotator within a chamber equipped with a sample inlet and a rotator according to an exemplary embodiment of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/ or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present invention are described in detail. However, these embodiments are exemplary, and this disclosure is not limited thereto.

A method of preparing a graphene nanoplate according to one exemplary embodiment may include preparing expanded graphite (EG); and exfoliating, grinding, or cracking the expanded graphite by gas-phase high speed collision (e.g., cracking of EGs induced by gas-phase-collision). The expanded graphite may be prepared by microwave treatment or heat treatment of ICC. The process of exfoliating, grinding, or cracking the expanded graphite by gas-phase high speed collision (e.g., cracking of EGs induced by gas-phase-collision) may be performed by inducing collision of the expanded graphite with a gas-phase speed at about $0.5 \times 10^2$ to about $10 \times 10^2$ m/s.

In other words, the process of exfoliating, grinding, or cracking the expanded graphite by gas-phase high speed collision may be performed by inducing collision of the expanded graphite with a gas-phase speed and thus the expanded graphite may be split (e.g., exfoliated, ground, or cracked). Herein, when the collision speed of the expanded graphite is greater than or equal to about $0.5 \times 10^2$ m/s, the graphene nanoplate may be obtained. Specifically, the collision speed may be about $0.5 \times 10^2$ to about $1,000 \times 10^2$ m/s, but the upper limit of the collision speed, $5 \times 10^2$ m/s may be set due to terms of current technology and limits of equipment, and thus the present invention may not be particularly limited to the above upper value. In other words, when the collision speed of greater than or equal to about $0.5 \times 10^2$ m/s is induced, graphene to be obtained in the present invention may be obtained.

Graphene to be obtained in the present invention may be obtained by splitting the expanded graphite using the gas-phase high speed collision. Since the graphene has a different two-dimensional sheet structure from the powder-type graphene or particle-type graphene obtained by a conventional ultrasonication cracking method, a cracking method using rheological shear stress, a solid-phase-a solid-phase or liquid mechanical grinding method (e.g., ball milling, meshing, and the like), and the like, may be referred to be as a graphene nanoplate. For example, the gas-phase collision speed of the expanded graphite refers to a speed of another expansion particle colliding with the expanded graphite particle when one expanded graphite particle is assumed to stop, and a speed of expanded graphite particles that collide from opposite sides may be minimum speed of about $0.5 \times 10^2$ m/s at a subsonic speed, and maximum speed of about $1.5 \times 10^3$ m/s at supersonic speed, which may be theoretically calculated. Therefore, when collision speeds between expanded graphite are greater than or equal to about $0.5 \times 10^2$ m/s, effective collision according to the present invention may occur.

The exfoliating, grinding, or cracking the expanded graphite by gas-phase high speed collision may be performed by a turbulence inducing method, a supersonic expansion method, or a combination thereof. The turbulence inducing method may include levitating expanded graphite, adjusting positions of the levitated expanded graphite and having the position-adjusted expanded graphite collide with each other. The process of levitating expanded graphite may be performed by rotating the rotator at a rotation speed of about 500 to about 2000 rpm, the process of the adjusting positions of the levitated expanded graphite may be performed by rotating the rotator at a rotation speed of about 5000 to about 9000 rpm, and the process of colliding the levitated expanded graphite may be performed by rotating the rotator at a rotation speed of about 10000 to about 15000 rpm.

In the process of colliding the levitated expanded graphite, the rotation speed of the rotator may be less than about 10000 rpm, a production amount of the graphene nanoplate may decrease, indicating that the collision speed of the expanded graphite may not reach $0.5 \times 10^2$ m/s when the rotation speed is less than about 10000 rpm. In other words, when the method for preparing a graphene nanoplate according to one exemplary embodiment of the present invention is for example the turbulence inducing method, chamber shapes, rotator shapes, the number of the rotator may be different based on the type of apparatus, modification thereof may be possible and in each step, a rotation speed of the rotator may be changed. However, when expanded graphite is cracked to produce a graphene nanoplate, a collision speed of the expanded graphite is important, and thus an apparatus to induce gas-phase collision of expanded graphite may induce a collision speed of the expanded graphite to be about $0.5 \times 10^2$ to about $10 \times 10^2$ m/s, without limitation.

Figure 2:
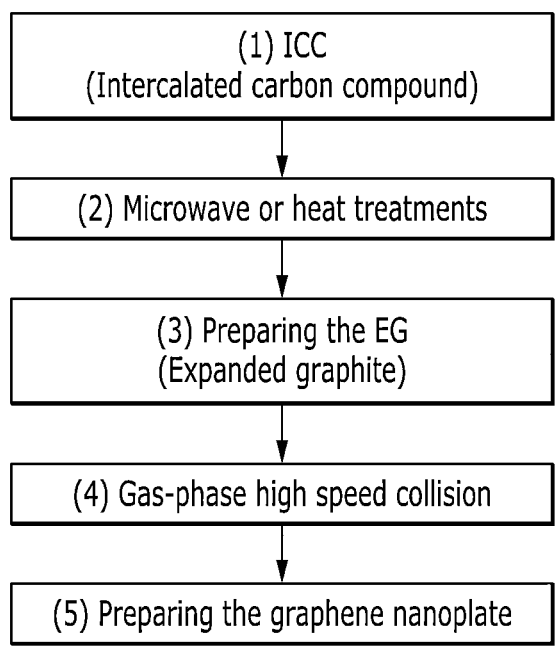
FIG. 2 schematically shows an exemplary preparation process of a graphene nanoplate from graphite according to an exemplary embodiment of the present invention.

As specific examples of the present invention, an operation principle of an apparatus performing the turbulence inducing method is described referring to FIG. 1 and FIG. 2. The apparatus for preparing the graphene nanoplate may be equipped with a rotator 2 operated by external power at a lower part and a sample inlet 5 at an upper part within a chamber 1. The expanded graphite may be inserted into the sample inlet and stacked in a lower part of the chamber, then the rotator may be rotated by external power, and to high-speed swirl 3 gases (e.g., a dispersing process), that is, turbulence may be formed. Generally, when the rotator is rotated at a rotation speed greater than or equal to about 7000 rpm, specifically about 5000 to about 9000 rpm for about 30 to about 60 seconds, the sample may be levitated to an upper part of the rotator while forming a gas whirlpool. Specifically, when the rotator is rotated at a rotation speed of about 10000 to about 15000 rpm for about 3 to about 5 minutes, a super-high speed gas-phase collision zone 4 may be formed and expanded graphite may be exfoliated, ground, or cracked.

As an example, the supersonic expansion method is a method of accelerating the expanded graphite by a supersonic speed and colliding the expanded graphite with a bulk solid, and the efficient collision speed of the expanded graphite accelerated by a supersonic speed may be expected to be substantially similar to the turbulence inducing method. Specific examples may be supersonic nozzle expansion method and aerosol deposition. The basic principle may be as follows: the expanded graphite may be accelerated from a subsonic speed to a supersonic speed by spraying expanded graphite from a high pressure part to a low pressure part using carrier gas in an apparatus equipped with a fine (e.g., narrow) nozzle between two chambers having a pressure difference, and the accelerated expanded graphite may collide a substrate in a lower pressure chamber or a bulk solid to split the expanded graphite.

Further, when a splitting phenomenon of expanded graphite according to a principle of the present invention is theoretically considered, powders having micrometer sizes may be nano-powderized by a subsonic speed of about $-1 \times 10^2$ m/s through powder cracking according to a collision theory and powderization efficiency by powder cracking may increase as the speed goes to a supersonic speed (e.g., about $3 \times 10^2$ m/s). In other words, for a micro powder at kinetic energy of about $E_k = \frac{1}{2}mv^2$ (wherein m is a weight of expanded graphite and v is a speed of expanded graphite), the micro powder may be sufficiently cracked at a speed greater than or equal to about $1 \times 10^2$ m/s (S. H. Huh, Carbon 3636 2010 and references therein). Therefore, the collision theory may be applied to the method of the exemplary embodiment and thus, the cracking phenomenon of expanded graphite may be explained. Substantially, a speed in a supersonic speed spray or turbulence may be difficult to measure directly, and a collision speed may be determined using various experiment and theoretical backgrounds. Accordingly, even though the speed of expanded graphite in the turbulence inducing method according to one exemplary embodiment of the present invention may be difficult to directly measure, a threshold speed of breaking the expanded graphite and producing a graphene nanoplate may begin from a subsonic speed.

Comprehensively, the present invention may use a principle of breaking expanded graphite and preparing a graphene nanoplate by converting gas-phase motion energy of the expanded graphite into collision energy when the expanded graphite absorbs the collision energy, which is different from a principle used in a conventional method of preparing a graphene nanoplate such as an ultrasonication grinding method, a grinding method using a rheological shear stress, a solid-phase-solid-phase or liquid mechanical grinding method. This powder-type graphene nanoplate prepared according to the gas-phase high speed collision may be variously applied into a liquid, a powder, a composite, and the like and may increase degrees of process freedom and thus, may be used as an industrially important raw material.

The graphene nanoplate according to the exemplary embodiment may be prepared using the above method. The graphene nanoplate may have a thickness ranging from about 5 to about 100 nm. When the graphene nanoplate has a thickness within the above range, the wrinkling of a graphene sheet may decrease during preparation of a coating liquid, advantageously realizing inherent properties of graphene. In addition, another exemplary embodiment industrially may apply the present invention by preparing a paste through a combination of the above graphene nanoplate powder and using the paste to form a conductivity layer. Another exemplary embodiment of the present invention provides an EG paste that may include the EG. A method of preparing the EG paste is illustrated referring to FIGS. 3 to 5.

Figure 3:
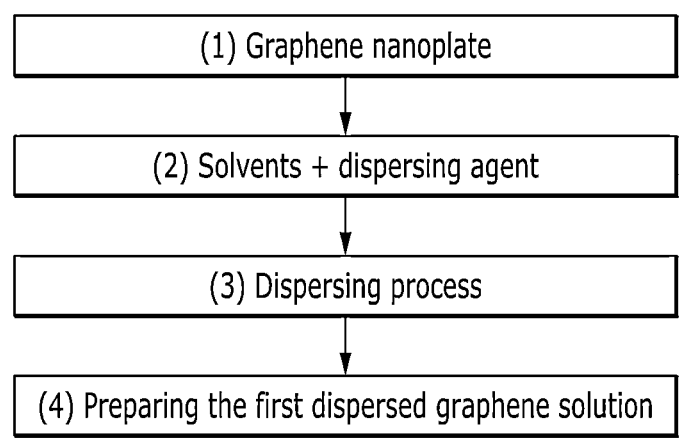
FIGS. 3 to 5 schematically show an exemplary preparation process of a graphene nanoplate paste from graphene nanoplate according to an exemplary embodiment of the present invention.
Figure 4:
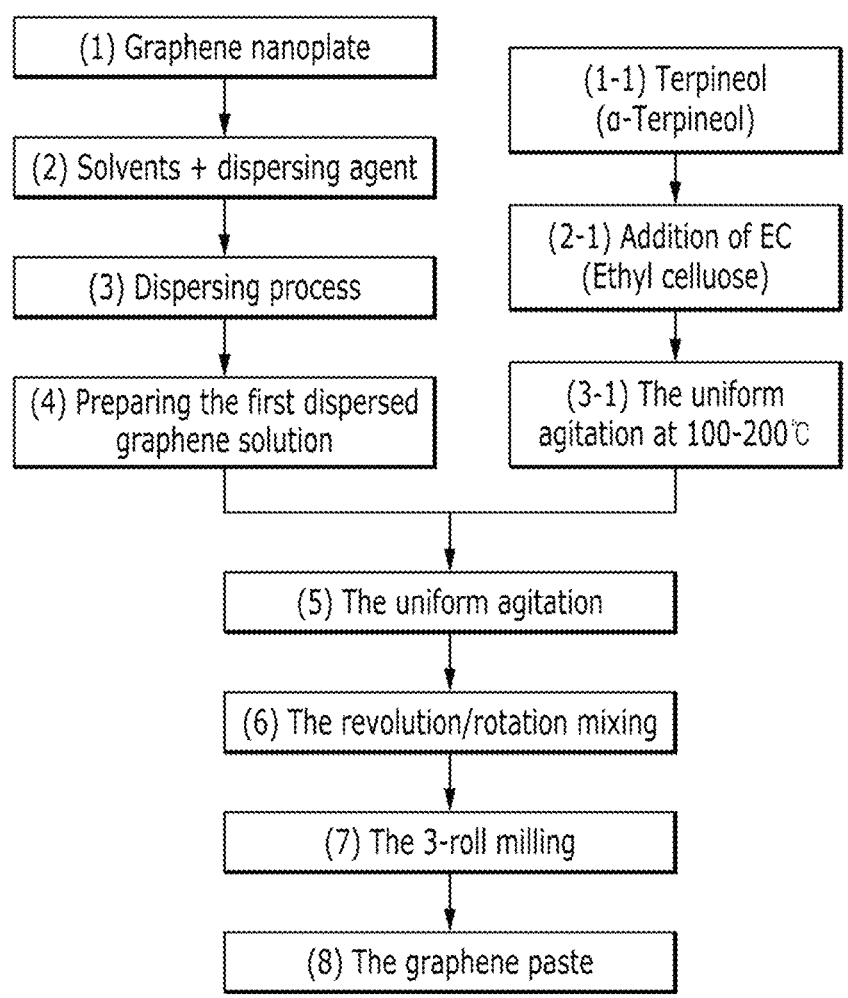
Figure 5:
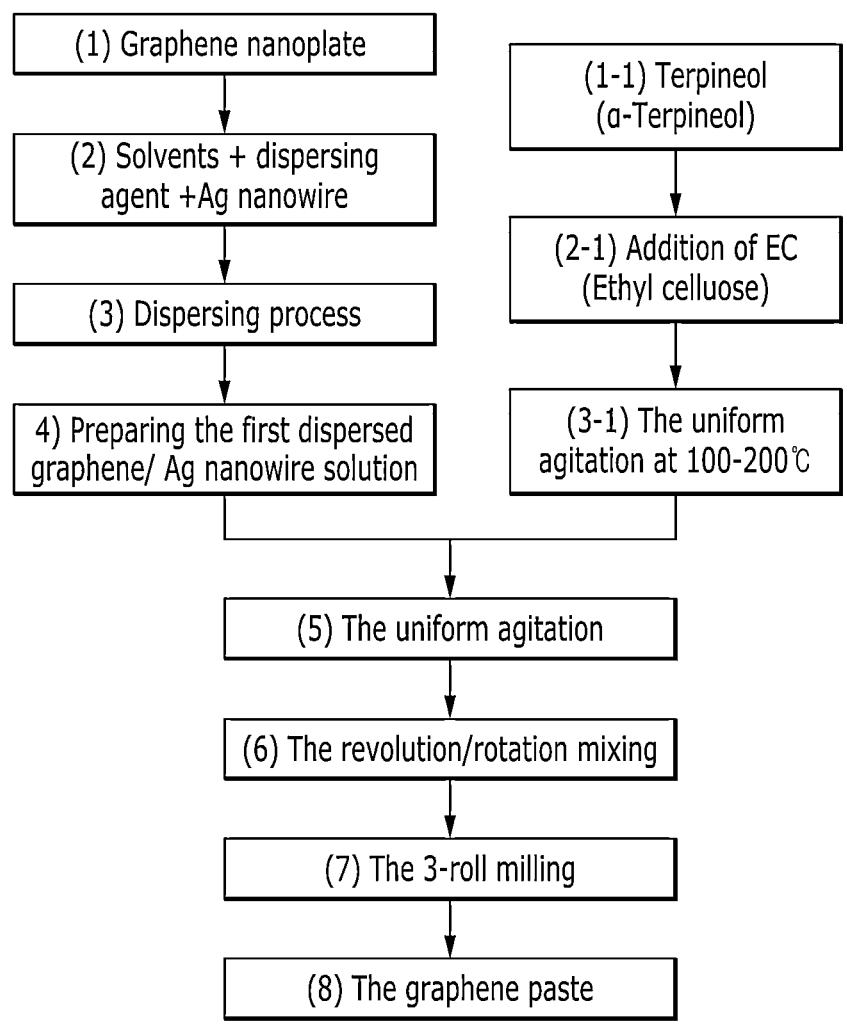

The EG according to one exemplary embodiment of the present invention may be used to prepare an EG dispersion, and the EG dispersion may be dispersion-treated according to a process illustrated in FIG. 3, preparing a primary EG dispersion. In addition, an EG paste may be prepared by preparing a paste solution, mixing the primary EG dispersion and the paste solution according to a process of FIG. 4, and treating the mixture through substantially uniform agitation, revolution/rotation mixing, roll milling, and the like. As shown in FIG. 5, the EG dispersion may further include a metal nanowire, a metal powder, and the like. In particular, when silver nanowire is used as specific examples of the metal nanowire, electrical conductivity may be improved, but the present invention is not limited thereto.

Specific examples of a solvent used in the EG dispersion may include water, acetone, methylethylketone, methylalcohol, ethylalcohol, isopropylalcohol, butylalcohol, ethylene glycol, polyethylene glycol, tetrahydrofuran, dimethylformamide, dimethyl acetamide, N-methyl-2-pyrrolidone, hexane, cyclohexanone, toluene, chloroform, distilled water, dichlorobenzene, dimethylbenzene, trimethylbenzene, pyridine, methylnaphthalene, nitromethane, acrylonitrile, octadecylamine, aniline, dimethylsulfoxide, and the like, but is not limited thereof. Herein, a dispersing agent may include polyethylene glycol (PEG), glycerol, hydrochloric acid (HCl), acetic acid, formic acid, citric acid, glycerin, glucose, and the like and may be included in an amount of about 3 volume % based on total amount of the solution. However, the dispersing agent is not limited thereto.

The EG dispersion may further include other additives such as a stabilizer, a leveling agent, a wetting agent, a binder, a filler (e.g., a polymer, ceramic, metal carbide, and the like), a secondary dispersing agent, acid, salt, base, amino acid, cellulose, protein, starch, and the like to adjust a viscosity, electrical conductivity, dispersibility, thickness of a coating layer, and the like, other than the dispersing agent. The dispersion treatment may be performed by ultrasonication, stirring, application of shear stress and shearing force, homogenization, or a combination thereof but is not limited thereto. The paste solution may be prepared by using a well-known compound such as α-terpineol, ethyl cellulose, butyl cellulose, toluene, hexane, isopropyl alcohol, and the like.

Another exemplary embodiment of the present invention provides a conductive coating layer that includes the graphene paste. The conductive coating layer may be formed in a common coating method, specifically, dip coating, spin coating, spray coating, paint coating, bar coating, flow coating, roll coating, or a combination thereof, and further specifically, dip coating, spin coating, or spray coating but is not limited thereof.

Hereinafter, specific exemplary examples of the present invention are illustrated. However, the present disclosure is illustrated in more detail with reference to examples. Furthermore, what is not described in this disclosure may be sufficiently understood by those skilled in the art and will not be illustrated here.

PREPARATION EXAMPLE 1

Manufacture of Microwave-Treated Expanded Graphite

EG (expanded graphite) was prepared by radiating 100 mg of ICC (an intercalated carbon compound) with a microwave having a wavelength of 2.45 GHz under an $N_2$ flow condition for 30 seconds.

PREPARATION EXAMPLE 2

Manufacture of Heat-Treated Expanded Graphite

EG was prepared by making a nitrogen gas ($N_2$) atmosphere in a tube furnace and exposing 10 mg of ICC to a thermal atmosphere for 30 seconds.

EXAMPLE 1

Graphene was prepared by treating the expanded graphite of Preparation Example 1 according to a gas-phase high speed collision principle in FIG. 1 and FIG. 2. Specifically, 50 mg of the EG was injected in an apparatus equipped with a rotor in the lower part of a 1 L rectangular chamber, and the apparatus was operated at 7000 rpm for 30 seconds, at 900 rpm for 30 seconds, and at 12,000 rpm for 3 minutes, to prepare GNP.

EXAMPLE 2

Graphene was prepared by treating the expanded graphite according to Preparation Example 2 according to a gas-phase high speed collision principle in FIG. 1 and FIG. 2. Specifically, 50 mg of the EG was injected in an apparatus equipped with a rotor in the lower part of a 1 L rectangular chamber, and the apparatus was operated at 7000 rpm for 30 seconds, at 7000 rpm for 30 seconds, at 900 rpm for 30 second, and at 12,000 rpm for 3 minutes, to prepare GNP.

EXAMPLE 3

Preparation of Graphene Dispersion 10 mg of the graphene obtained in Example 1 or 2 was mixed with 50 ml of IPA and 0.01 g of Triton X-100, and the mixture was ultrasonication-treated for 5 minutes, to prepare a primary dispersion. The primary dispersion was not surface-treated and high dispersion-treated with a binder and the like and thus, a process of preparing a final coating liquid within two hours was required.

EXAMPLE 4

Preparation of GNP Paste 40 g of EC was slowly added to 1000 ml of α-terpinol and completely dissolved therein, while the α-terpinol was agitated and heated at 150-200° C. Separately, 500 mg of graphene was put in 500 g of NMP, and the mixture was ultrasonically treated for 10 minutes. This dispersed graphene solution was added to the α-terpinol/EC solution, and the mixture was uniformly mixed. Then, a GNP paste having viscosity of 1,000 cp was prepared through revolution/rotation mixing and 3-roll milling.

EXAMPLE 5

Preparation of GNP/AgNW Paste 40 g of EC was slowly added to 1000 ml of α-terpinol and completely dissolved therein, while the α-terpinol was agitated and heated at 150-200° C. Separately, 100 mg of graphene and 400mg of silver nanowire (AgNW) were put in 500 g of NMP, and the mixture was ultrasonically treated for 10 minutes. This dispersed GNP solution was added to the α-terpinol/EC solution, and the mixture was uniformly mixed. Then, a GNP/AgNW paste having a viscosity of 800 cp was prepared through revolution/rotation mixing and 3-roll milling.

EXAMPLE 6

Formation of Conductive Coating Layer

GNP and GNP/AgNW was bar-coated to form a 30 micron-long and 30 micron-thick layer and then, vacuum-dried at room temperature, 50° C., and 100° C.

Evaluation 1: Property Evaluation of Graphene

When thickness of the GNP according to an exemplary embodiment of the present invention was measured with field emission-scanning electron microscopy FE-SEM (Jeoul), the GNP had a thickness of about 5-30 nm, and FIGS. 7 to 10 show thickness and surface evaluations of the graphene according to one exemplary embodiment of the present invention.

Figure 6:
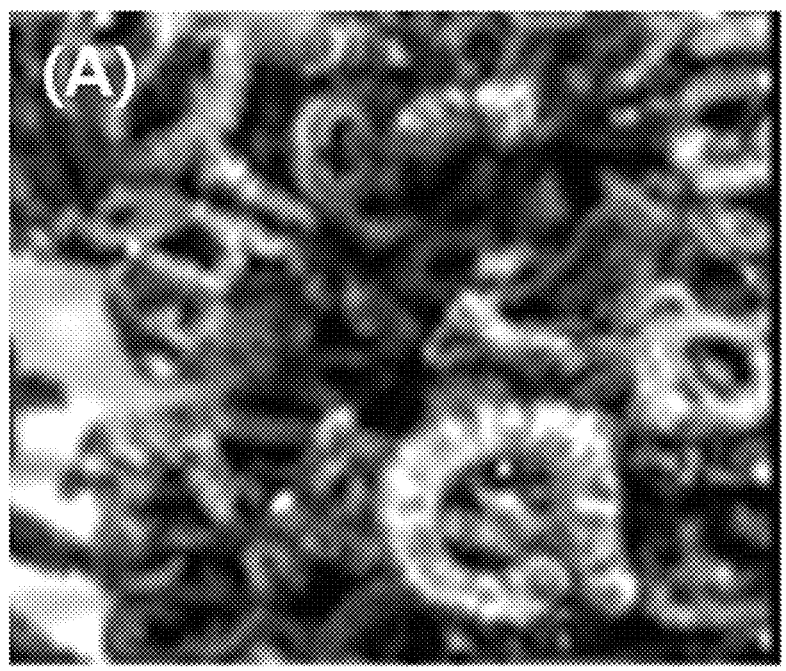
FIG. 6 is an exemplary optical microscope photograph of expanded graphite prepared by microwave treatment of ICC according to an exemplary embodiment of the present invention.
Figure 7:
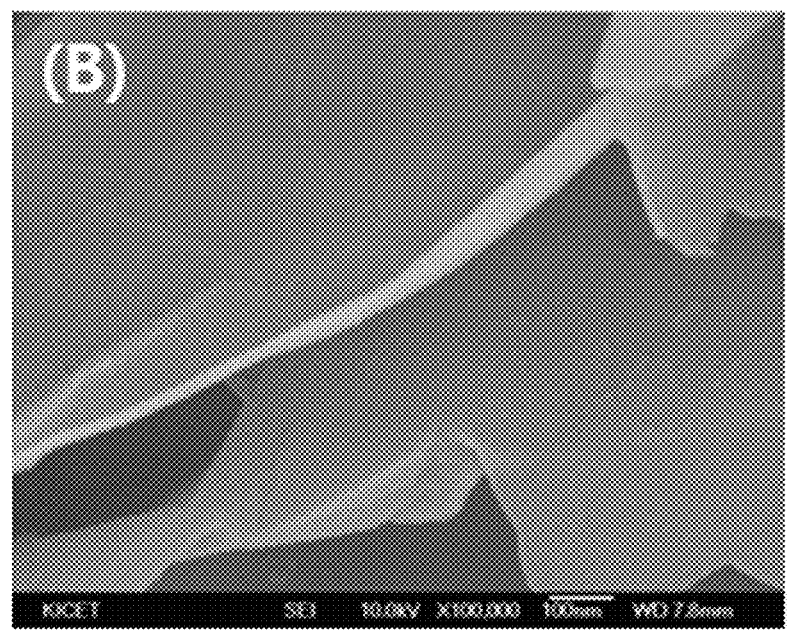
FIG. 7 is an exemplary FE-SEM photograph of a graphene nanoplate according to one exemplary embodiment of the present invention.
Figure 8:
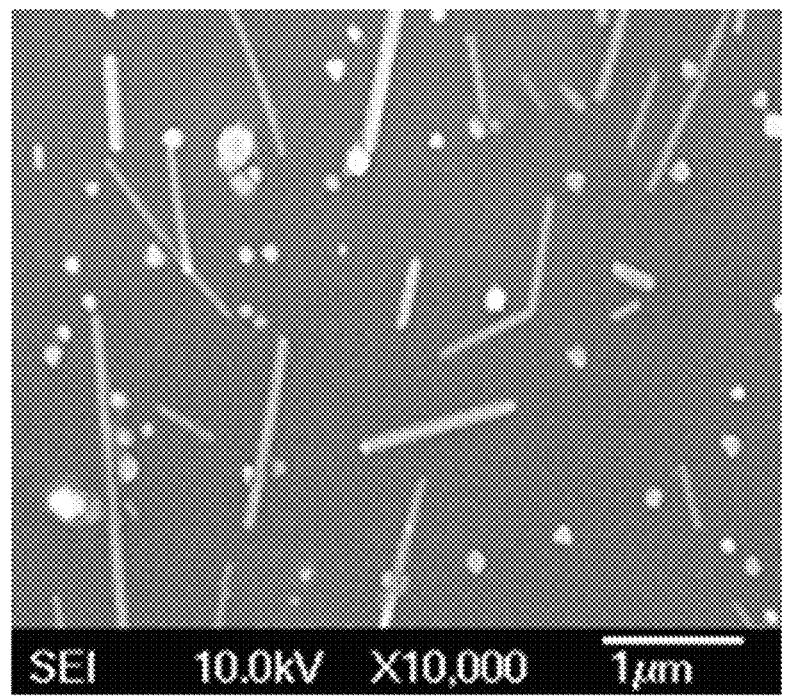
FIG. 8 is exemplary FE-SEM photographs of silver nanowire and silver nanoparticle according to an exemplary embodiment of the present invention.
Figure 9:
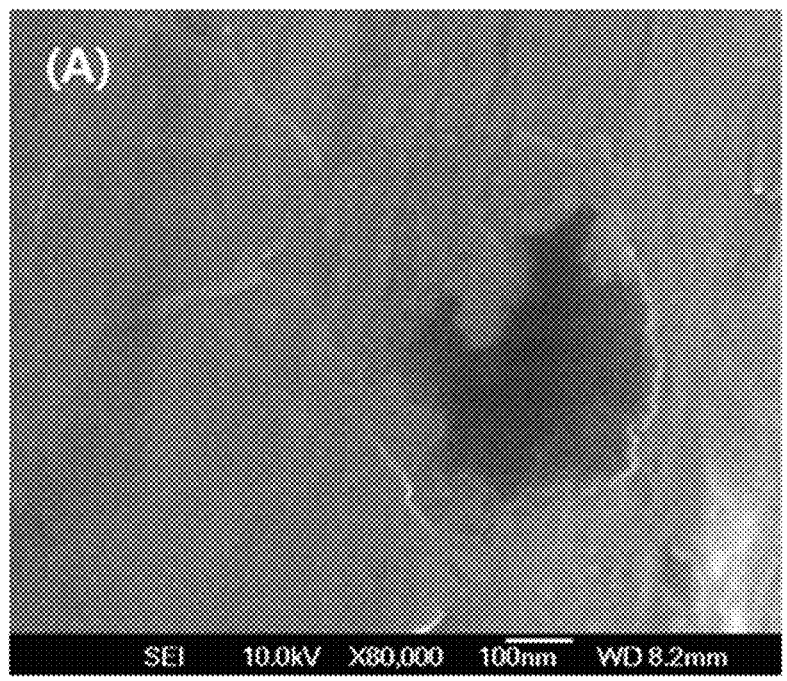
FIG. 9 is an exemplary FE-SEM photograph of a conductive coating layer using a graphene paste according to one exemplary embodiment of the present invention.
Figure 10:
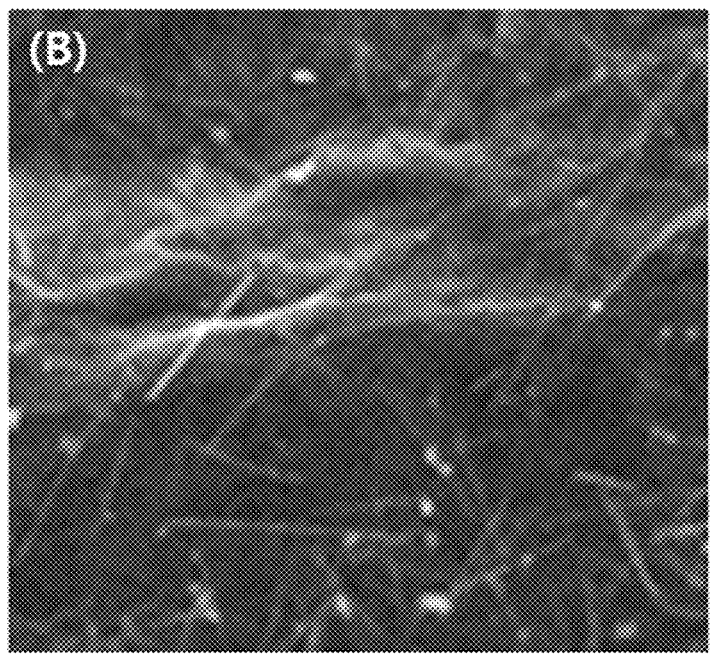
FIG. 10 is an exemplary FE-SEM photograph of a conductive coating layer using a graphene composite paste according to one exemplary embodiment of the present invention.

FIG. 6 is an exemplary optical microscope photograph showing expanded graphite prepared by treating ICC with a microwave. FIG. 7 is an exemplary FE-SEM photograph showing graphene nanoplate according to one exemplary embodiment of the present invention. FIG. 8 is an exemplary FE-SEM photograph showing a composition for a coating layer according to one exemplary embodiment of the present invention. FIG. 9 is an exemplary FE-SEM photograph showing a graphene nanopaste conductive layer according to one exemplary embodiment of the present invention. FIG. 10 is an exemplary FE-SEM photograph showing a graphene nanopaste conductive layer including silver (Ag) nanowire according to one exemplary embodiment of the present invention.

The graphene nanoplate prepared according to the exemplary embodiment of the present invention had a substantially large plate structure having a sufficient nano thickness and a reduced amount of wrinkles as shown in FIG. 7, and may maximize two dimensional plate structure effects during preparation of composite and paste. In other words, as shown in the FE-SEM photographs of FIGS. 9 and 10, the conductive coating layer according to one exemplary embodiment of the present invention was formed of powder having a different structure form a conventional particle-type powder and linear powder and thus, had improved electrical conductivity (hereinafter, refer to the following Example).

Evaluation 2: Sheet Resistance of Conductive Coating Layer

Graphene and graphene/AgNW was bar-coated to form a 30 micron-long and thick conductive layer, resistance of the layer was measured using a 4 probe method, and the result was provided as in the following Table 1.

TABLE 1

|  | Sheet Resistance (Ω/sq) |
| --- | --- |
| Example 1 | 1.5 |
| Example 2 | 0.7 |

Referring to Table 1, the conductive layer according to one exemplary embodiment of the present invention showed sheet resistance of greater than or equal to 0.7 Ω/sq and thus, may be used as a sheet-shaped or line-shaped heating element.

DESCRIPTION OF SYMBOLS

1: chamber 2: rotator
3: super-high speed gas vortex 4: super-high speed gas-phase collision zone
5: sample inlet While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the accompanying claims.

What is claimed is:

1. A method of preparing a graphene nanoplate (GNP), comprising:
   preparing expanded graphite (EG); and
   exfoliating, grinding, or cracking the EG by colliding the expanded graphite by a gas-phase high speed to crack the EG induced by gas-phase-collision,
   wherein the exfoliating, grinding, or cracking the expanded graphite by gas-phase high speed collision is performed using a turbulence-inducing method including:
      transferring the expanded graphite into a chamber equipped with a sample inlet and a rotator at a lower part of the chamber, and
      spinning the rotator to induce turbulence into the chamber, and exfoliating, grinding, or cracking the expanded graphite by the induced turbulence, and
   wherein the gas-phase high speed collision is performed by inducing the expanded graphite to collision at the gas-phase high speed of about $0.5 \times 10^2$ to about $10 \times 10^2$ m/s.

2. A graphene nanoplate prepared by a method comprising:
   preparing expanded graphite (EG); and
   exfoliating, grinding, or cracking the EG by colliding the expanded graphite by a gas-phase high speed to crack the EG induced by gas-phase-collision,
   wherein the exfoliating, grinding, or cracking the expanded graphite by gas-phase high speed collision is performed using a turbulence-inducing method including:
      transferring the expanded graphite into a chamber equipped with a sample inlet and a rotator at a lower part of the chamber, and
      spinning the rotator to induce turbulence into the chamber, and exfoliating,
   grinding, or cracking the expanded graphite by the induced turbulence, and
   wherein the gas-phase high speed collision is performed by inducing the expanded graphite to collision at the gas-phase high speed of about $0.5 \times 10^2$ to about $10 \times 10^2$ m/s.

3. The graphene nanoplate of claim 2, which has a thickness ranging from about 5 nm to about 100 nm.

4. A graphene nanoplate paste prepared by a method of preparing an expanded graphite dispersion including mixing the graphene nanoplate of claim 2, a dispersing agent, and a solvent, comprising:
   preparing a paste solution; and
   agitating the expanded graphite dispersion and the paste solution.

5. The graphene nanoplate paste of claim 4, wherein the graphene nanoplate paste includes a conductive coating layer.

* * * * *